(12) United States Patent
Liu et al.

(10) Patent No.: US 7,646,404 B2
(45) Date of Patent: *Jan. 12, 2010

(54) FOVEATED WIDE-ANGLE IMAGING SYSTEM AND METHOD FOR CAPTURING AND VIEWING WIDE-ANGLE IMAGES IN REAL TIME

(75) Inventors: Zicheng Liu, Bellevue, WA (US); Michael Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

This patent is subject to a terminal disclaimer.

(21) Appl. No.: 11/382,253

(22) Filed: May 8, 2006

(65) Prior Publication Data
US 2006/0209194 A1   Sep. 21, 2006

Related U.S. Application Data

(63) Continuation of application No. 10/262,292, filed on Sep. 30, 2002, now Pat. No. 7,084,904.

(51) Int. Cl.
*H04N 5/225* (2006.01)
*H04N 7/00* (2006.01)
*H04N 13/02* (2006.01)

(52) U.S. Cl. .................. 348/218.1; 348/36; 348/48

(58) Field of Classification Search .............. 348/36, 348/47–48, 14.1, 14.09, 211.12, 218.1, 239; 345/647

See application file for complete search history.

(56) References Cited

U.S. PATENT DOCUMENTS

| | | | | |
|---|---|---|---|---|
| 4,199,785 A * | 4/1980 | McCullough et al. | ....... | 348/704 |
| 5,703,961 A * | 12/1997 | Rogina et al. | ............... | 382/154 |
| 5,796,426 A * | 8/1998 | Gullichsen et al. | ..... | 348/207.99 |
| 6,476,812 B1 * | 11/2002 | Yoshigahara et al. | ........ | 345/427 |
| 6,549,215 B2 * | 4/2003 | Jouppi | ........................ | 345/660 |
| 6,778,207 B1 * | 8/2004 | Lee et al. | ...................... | 348/36 |
| 6,954,310 B2 * | 10/2005 | Holloway et al. | ........... | 359/619 |
| 7,015,954 B1 * | 3/2006 | Foote et al. | .............. | 348/218.1 |
| 2004/0001137 A1 * | 1/2004 | Cutler et al. | ............. | 348/14.08 |
| 2004/0010803 A1 * | 1/2004 | Berstis | ....................... | 725/105 |
| 2004/0066449 A1 * | 4/2004 | Givon | ......................... | 348/48 |

\* cited by examiner

*Primary Examiner*—Kelly L Jerabek
(74) *Attorney, Agent, or Firm*—Lyon & Harr, L.L.P.; Craig S. Fischer

(57) ABSTRACT

A foveated wide-angle imaging system and method for capturing a wide-angle image and for viewing the captured wide-angle image in real time. In general, the foveated wide-angle imaging system includes a foveated wide-angle camera system having multiple cameras for capturing a scene and outputting raw output images, a foveated wide-angle stitching system for generating a stitch table, and a real-time wide-angle image correction system that creates a composed warp table from the stitch table and processes the raw output images using the composed warp table to correct distortion and perception problems. The foveated wide-angle imaging method includes using a foveated wide-angle camera system to capture a plurality of raw output images, generating a composed warp table, and processing the plurality of raw output images using the composed warp table to generate a corrected wide-angle image for viewing.

18 Claims, 13 Drawing Sheets

FOVEATED WIDE-ANGLE IMAGING SYSTEM AND METHOD FOR CAPTURING AND VIEWING WIDE-ANGLE IMAGES IN REAL TIME

CROSS REFERENCE TO RELATED APPLICATIONS

This application is a continuation application of U.S. Ser. No. 10/262,292, entitled "Foveated Wide-Angle Imaging System and Method for Capturing and Viewing Wide-Angle Images in Real Time" filed Sep. 30, 2002, now pending, the entire contents of which are hereby incorporated by reference.

BACKGROUND

In many situations it is desirable to capture an entire large scene and view the captured scene as a wide-angle image. Wide-angle cameras typically are used to capture these large scenes and provide the wide-angle image of the scene. In general, a wide-angle camera has a field-of-view greater than approximately 60 degrees. Additionally, a wide-angle camera includes a panoramic camera, which is an extremely wide-angle camera having a field-of-view of up to 360-degrees. Wide-angle views can be recorded with current systems either with special lenses or by sweeping a camera across a scene. The former method suffers from low and/or irregular resolution. The latter method cannot record a scene all at one time.

A wide-angle camera also enables instantaneous virtual panning and zooming. A wide-angle camera captures an entire or large portion of a scene in a single image, and therefore panning and zooming can be performed instantaneously without physically moving the camera or camera lens. In addition, a wide-angle camera can be used to provide guidance for a secondary pan/tilt/zoom camera. Thus, wide-angle cameras are highly desirable in many situations.

Under normal viewing conditions, the wide-angle images obtained from wide-angle cameras suffer from two kinds of distortions. First, normal perspective images can create distortions especially near the corners. Second, the apparent depth differences between objects are often exaggerated.

Wide-angle images obtained from wide-angle cameras can be viewed using at least two types of projections. A linear perspective projection is an image captured by a wide-angle lens that is projected onto a flat piece of film. Linear perspective projection keeps straight lines straight at the expense of maintaining shape. This causes perspective deformations. The deformations on the image plane make the user feel that the scene is not rigid, as if the scene were swimming around the viewer, particularly when viewing panoramic images.

A cylindrical projection is produced using a wide-angle camera having curved film and a rotating slit lens. Cylindrical projections are better at maintaining shape than linear projections. However, the cylindrical projection curves straight lines more than necessary.

A related problem is that wide-angle images exaggerate the depth disparity between near and far objects. One important visual cue of the depth of an object in a scene is the ratio between the image sizes of similar objects placed at near and far locations (called the depth foreshortening ratio). A smaller field-of-view results in a smaller foreshortening ratio. When a wide-angle image of a deep scene (such as a video conferencing scene) is viewed on a computer monitor, the viewer's field-of-view, in general, is much smaller than the field-of-view of the actual images. Therefore, the depth perceived by the viewer is much larger than the actual depth.

One application where these depth (along with other distortion and perception) problems and errors manifest themselves is in video conferencing applications. Wide-angle cameras often are used in video conferencing systems to capture and transmit a wide-angle image containing all participants present in a meeting room. When viewing the videoconference, however, the wide-angle image exaggerates the depth of the room. This causes the people in the middle of the image (who are usually furthest away from the camera) to appear quite small compared to others in the room due to the extreme foreshortening.

Video conferencing systems often employ a pan/tilt/zoom camera that has a motor that allows the camera to turn to find the current speaker and then zoom in for a closer look. This type of system has latency problems since it must first turn and zoom to find a new subject of interest.

Other video conferencing systems use a wide-angle camera having a plurality of cameras. By covering the whole room simultaneously, the latency problem is overcome. Typically, each of the plurality of cameras has the same field-of-view. This means that a wide-angle image captured by the wide-angle camera has a uniform pixel density across the entire wide-angle image. Pixel density is defined as the number of pixels per area of the image. Typically, the captured wide-angle image is processed to attempt to alleviate distortion and perception problems and errors. Using the example above, a captured wide-angle image may contain a scene of participants in a conference room. In order to better view the meeting participants (which are very small) in the center of the wide-angle image, one could uniformly zoom up a sub-region in the center and show the center portion only. Another possibility, as will be discussed below, is to scale the image differently at different locations so that the center portion is scaled up more while still keeping all the people in the image. The center of the wide-angle image can be enlarged to make the furthest participant about the same size as the other meeting participants at the outer portions of the wide-angle image.

One problem, however, is that the pixel density is small in the center of the wide-angle image. By way of example, three or four pixels may be all that represent a meeting participant's face at the center of the wide-angle image. When the center image is enlarged, the three or four representative pixels become blobs. This makes it difficult if not impossible to effectively eliminate distortion and perception problems and errors in the wide-angle image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foveated wide-angle imaging system and a method disclosed herein allows the capturing and viewing of wide-angle images of a scene. The capturing of the wide-angle images is achieved using a novel foveated wide-angle camera system. The output of the camera system is then processed to alleviate distortion and perception problems. After processing, the resulting corrected wide-angle image is a dewarped and corrected version of the output of the camera system.

The foveated wide-angle imaging system and method allows efficient and effective correction of wide-angle images by using a foveated wide-angle camera system to capture a scene. The foveated wide-angle camera system includes a plurality of cameras. These cameras are typically arranged in a hemispherical manner. Additionally, the field-of-view from each of the cameras typically overlaps slightly. A center camera that is located in the center of the hemisphere has the narrowest field-of-view of all the plurality of cameras. Other cameras are arranged on either side of the center camera in a hemispherical manner. The field-of-view for these cameras steadily increases the further away from the center camera a camera is located. Thus, the cameras on either side adjacent to the center camera have a slightly higher field-of-view than the center camera, but cameras furthest away from the center camera have a significantly higher field-of-view as compared to the center camera.

This novel camera arrangement provides a foveated wide-angle image from the foveated wide-angle camera. Foveated means that there is a higher pixel density in the center region of the image and a lower pixel density toward the outer regions of the image. Foveating the image provides enough resolution at the center region of the image so that pixels of persons or objects at or near the center of the image can be enlarged and distortion and perception problems corrected.

In general, the foveated wide-angle imaging system includes a foveated wide-angle camera system for capturing a wide-angle image and viewing the captured wide-angle image. The system includes a foveated wide-angle camera system having multiple cameras for capturing a scene, and a foveated wide-angle stitching system. The stitching system generates a stitch table that can be used to "stitch" together raw output images from the foveated wide-angle camera system to create a preliminary foveated wide-angle image. The foveated wide-angle imaging system also includes a real-time wide-angle image correction system that processes the stitch table to correct distortion and perception problems present in the preliminary foveated wide-angle image. The real-time wide-angle image correction system uses a warping function to generate a warp table. This warp table then is used to dewarp the preliminary foveated wide-angle image and create a corrected wide-angle image for viewing.

The foveated wide-angle imaging method includes using a foveated wide-angle camera system to capture a plurality of raw output images, generating a composed warp table, and processing the plurality of raw output images using the composed warp table to generate a corrected wide-angle image. The composed warp table is generating by composing a warp table and a stitch table. The stitch table is produced from the plurality of raw output images, and a warping function is used to generate the warp table. The warp table is then composed with the stitch table to generate a composed warp table. Once the composed warp table is created, it is used to process the raw output images and generate a corrected wide-angle image. The corrected wide-angle image is a corrected version of the preliminary foveated wide-angle image.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the foveated wide-angle imaging system and a method, reference is made to the accompanying drawings, which form a part thereof, and in which is shown by way of illustration a specific example whereby the foveated wide-angle imaging system and a method may be practiced. It is to be understood that other embodiments may be utilized and structural changes may be made without departing from the scope of the claimed subject matter.

I. General Overview

The foveated wide-angle imaging system and method disclosed herein includes capturing and viewing those captured wide-angle images in real time. The foveated wide-angle imaging system and method allows a scene to be captured such that the output are wide-angle images that do not have the stretching, curvature distortions, and exaggerated depth problems that plague traditional wide-angle images. In addition, when used in a video conferencing environment the foveated wide-angle imaging system and method provide pan, tilt and zoom of the videoconferencing environment without latency. Specifically, video conferencing systems need to be able to display a wide set of views to allow remote viewers to see all the participants. Typically, these participants are seated around a table. Current systems use one or more tilt/pan/zoom cameras to provide the possibility of viewing different portions of the room. However, due to mechanical movement, these current systems suffer from latency when panning to cover a new speaker. The foveated wide-angle camera system of the foveated wide-angle imaging system alleviates these latency problems since no mechanical motion is needed.

The foveated wide-angle camera system of the foveated wide-angle imaging system includes a plurality of cameras arranged in a novel manner. This arrangement allows a center region of the captured wide-angle image to have a higher number of pixels per area (pixel density) than outer regions of the wide-angle image. Raw outputs from each of the plurality of cameras are "stitched" together using a stitch table so that a preliminary wide-angle image can be generated. This preliminary wide-angle image, however, contains stretching, curvature distortions, and exaggerated depth problems. These problems are mitigated by using a real-time wide-image correction system that composes the stitch table with any warping function to generate a corrected wide-angle image. In one aspect of the invention, the warping function is in a new class of parametric warping functions called Spatially Varying Uniform (SVU) scaling functions. These warping functions preserve local scaling perspectives and correct for depth misperception.

Figure 1:
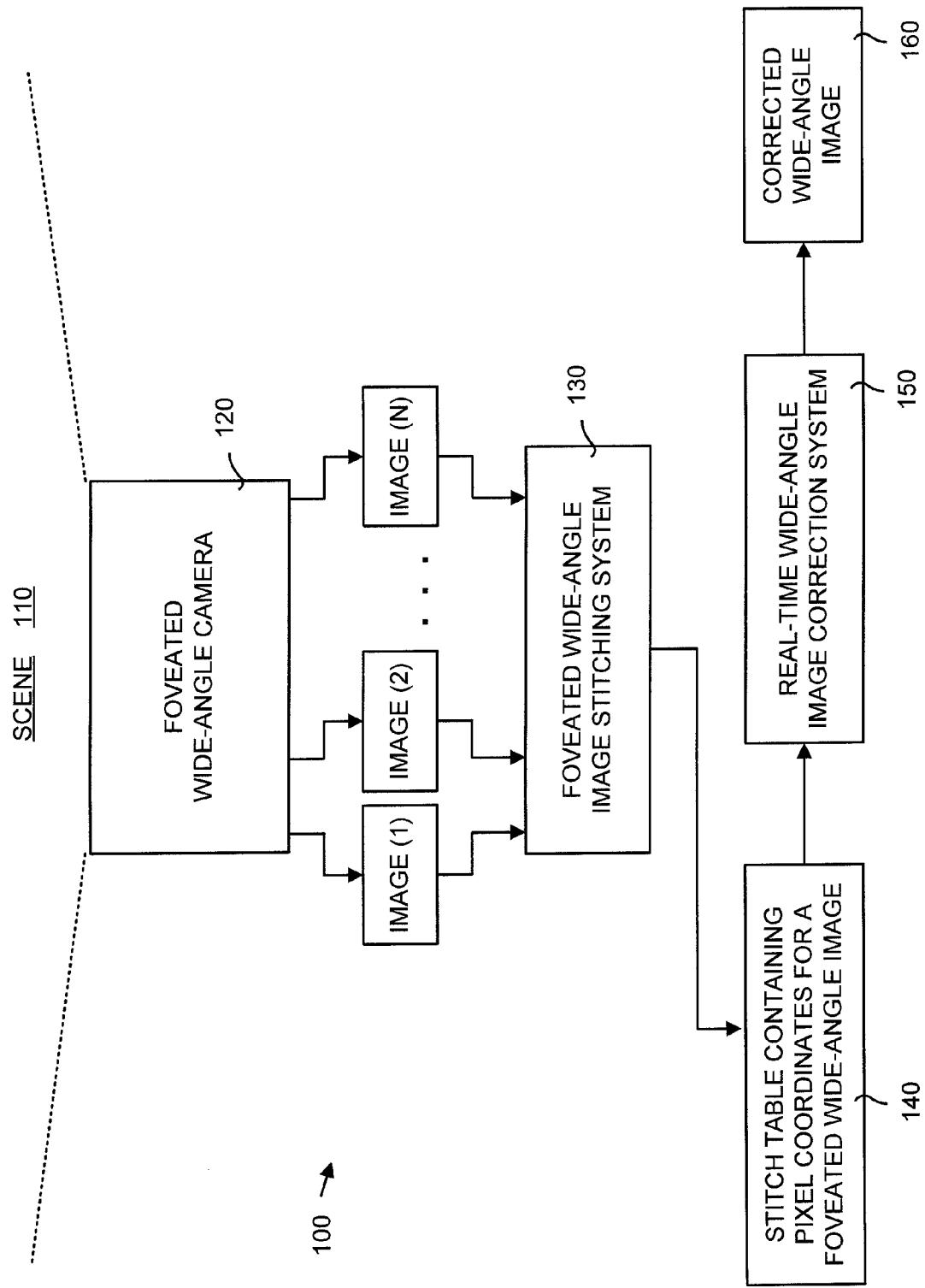
FIG. 1 is a block diagram illustrating a general overview of the foveated wide-angle imaging system of the invention.

FIG. 1 is a block diagram illustrating a general overview of the foveated wide-angle imaging system 100 of the invention. In general, the system 100 captures a scene 110 using a foveated wide-angle camera system 120 and outputs a wide-angle image corrected for distortion and perception errors. In particular, as shown in FIG. 1, the foveated wide-angle imaging system 100 includes a foveated wide-angle camera system 120 to capture a scene 110. As explained in detail below, the foveated wide-angle camera system 120 is modeled in part on a human biological vision system that affords higher visual acuity in the center region of the scene 110 capture by the camera 120.

The camera 120, which includes a plurality of cameras, outputs a plurality of images (image (1) to image (N)) to a foveated wide-angle image stitching system 130. The stitching system 130 generates a stitch table 140 containing pixel coordinates for a preliminary wide-angle image. The stitch table allows each of the images (image (1) to image (N)) to be joined into a single preliminary foveated wide-angle image. In order to correct any distortion and perception problems the preliminary image is processed by a real-time wide-angle image correction system 150. The real-time wide-angle image correction system 150 uses the stitch table and a warping function to correct the preliminary wide-angle image and generate a corrected wide-angle image 160.

II. Exemplary Operating Environment

The foveated wide-angle imaging system 100 of the invention is designed to operate in a computing environment. The following discussion is intended to provide a brief, general description of a suitable computing environment in which the invention may be implemented.

Figure 2:
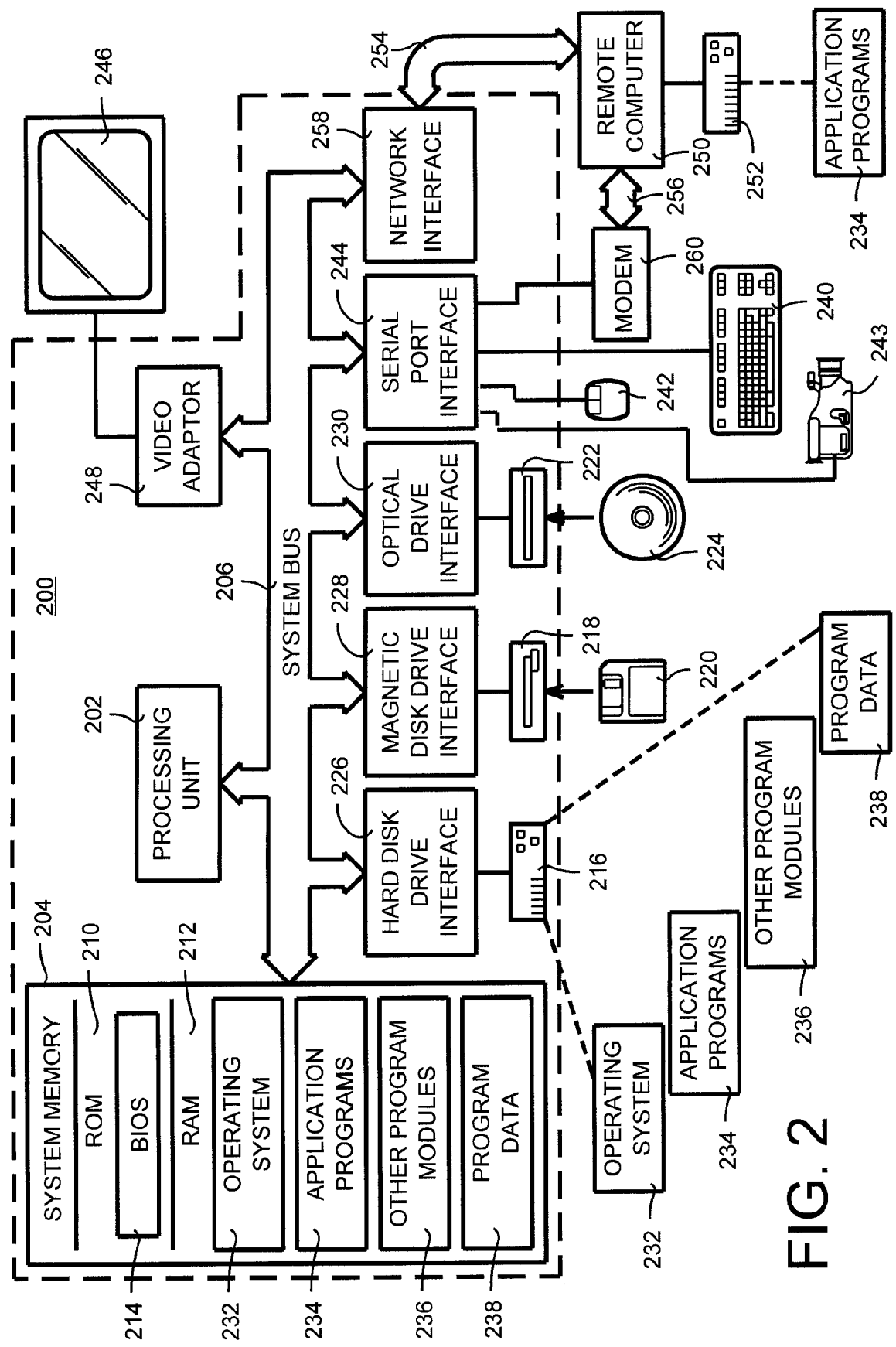
FIG. 2 is a block diagram illustrating a computing apparatus suitable for carrying out the invention.

FIG. 2 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 2, an exemplary system for implementing the invention includes a general-purpose computing apparatus 200. In particular, the computing apparatus 200 includes the processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the computing apparatus 200, such as during start-up, is stored in ROM 210. The computing apparatus 200 further includes a hard disk drive 216 for reading from and writing to a hard disk, not shown, a magnetic disk drive 218 for reading from or writing to a removable magnetic disk 220, and an optical disk drive 222 for reading from or writing to a removable optical disk 224 such as a CD-ROM or other optical media. The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the computing apparatus 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 and program data 238. A user (not shown) may enter commands and information into the computing apparatus 200 through input devices such as a keyboard 240 and a pointing device 242. In addition, a camera 243 (such as a video camera) may be connected to the computing apparatus 200 as well as other input devices (not shown) including, for example, a microphone, joystick, game pad, satellite dish, scanner, or the like. These other input devices are often connected to the processing unit 202 through a serial port interface 244 that is coupled to the system bus 206, but may be connected by other interfaces, such as a parallel port, a game port or a universal serial bus (USB). The monitor 246 (or other type of display device) is also connected to the system bus 206 via an interface, such as a video adapter 248. In addition to the monitor 246, computing devices such as personal computers typically include other peripheral output devices (not shown), such as speakers and printers.

The computing apparatus 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the computing apparatus 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the computing apparatus 200 is connected to the local network 254 through a network interface or adapter 258. When used in a WAN networking environment, the computing apparatus 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the computing apparatus 200, or portions thereof, may be stored in the remote memory storage device 252. It will be appreciated that the network connections shown are exemplary and other means of establishing a communications link between the computers may be used.

III. System Components

The foveated wide-angle imaging system 100 includes a number of components. Together, these components allow the system to capture a wide-angle image of a scene and process the captured the wide-angle image such that a corrected version of the captured wide-angle image can be viewed in real time. In general, the components of the system 100 include a foveated wide-angle camera system, a foveated wide-angle image stitching system, and a real-time wide-angle image correction system. Each of these components will now be discussed in detail.

Foveated Wide-Angle Camera System

The foveated wide-angle camera system 120 provides image from a plurality of cameras such that a wide-angle image of a scene is captured. In general, the foveated wide-angle camera 120 includes a camera in the center having a narrow field-of-view and cameras arranged around the center camera having increasingly wider field-of-view. This arrangement yields a wide-angle image having a higher pixel density in the center and lower pixel density toward the outer edges of the wide-angle image.

The foveated wide-angle camera 120 is based on a biological vision system, such as a human vision system. In human vision systems, the retina of the human eye contains a small portion of the retina called the fovea. The fovea is the center of the macula and is responsible for the central, sharpest, and highest visual acuity. The fovea contains a high concentration of cone photoreceptors (or cone density) that allow high visual acuity within only a few degrees of gaze. Outside of this fovea region the eye's spatial resolution drops off significantly. Thus, when a human eye fixates or looks directly at an object, the object is imaged on the fovea and is seen in detail, while other objects more than a few degrees outside of the gaze contain much less detail.

Figure 3:
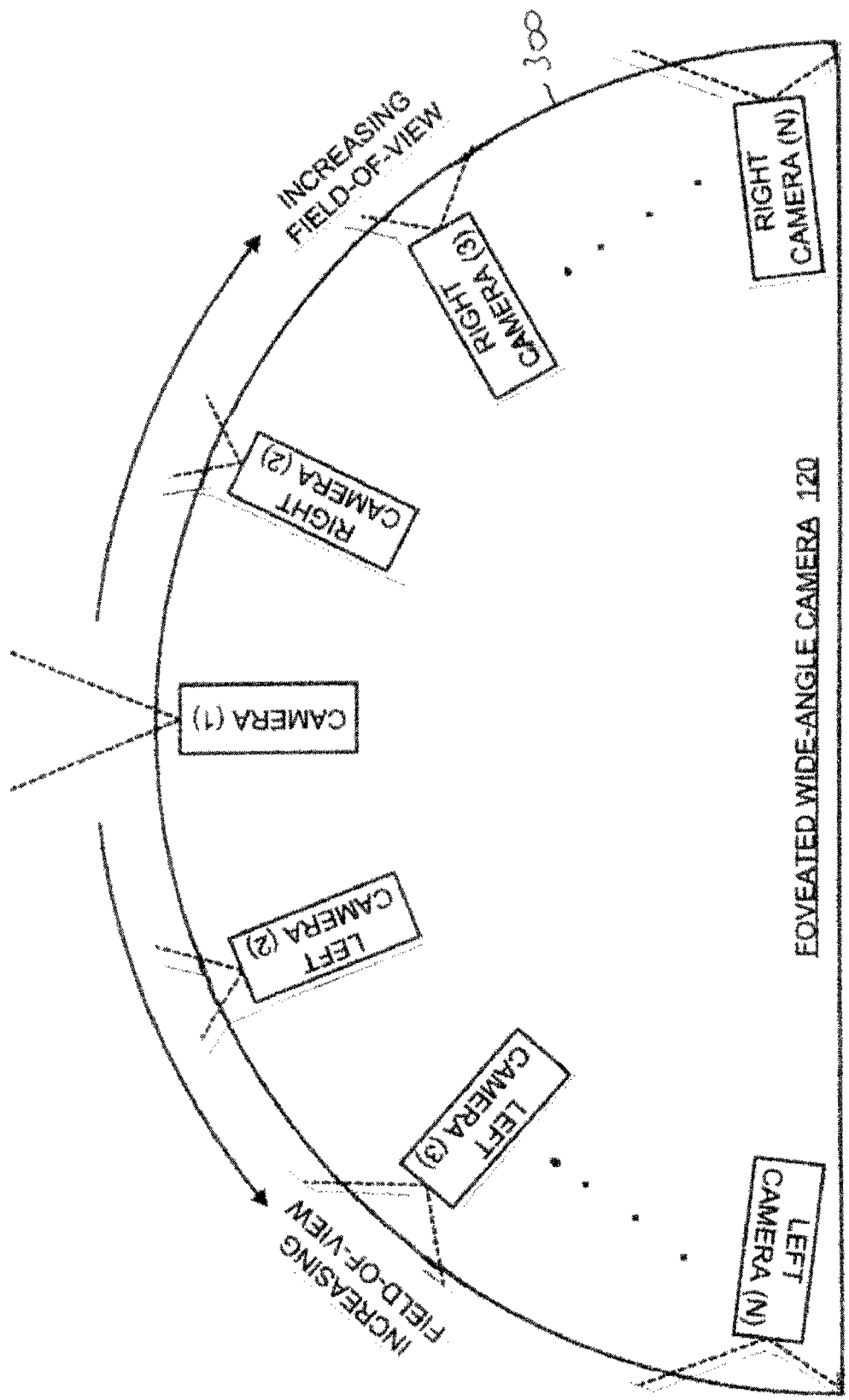
FIG. 3 is a block diagram illustrating the details of the foveated wide-angle camera system shown in FIG. 1.

In order to mimic the human vision system, the foveated wide-angle camera 120 is constructed as shown in FIG. 3. FIG. 3 is a block diagram illustrating the details of the foveated wide-angle camera system 120 shown in FIG. 1. The foveated wide-angle camera 120 has a plurality of cameras that are arranged on a hemispherical edge 300. A center camera, camera (1), is located in the center of the hemispherical edge 300. Camera (1) has the narrowest field-of-view of all the other cameras, as shown by the dashed lines on camera (1).

Other cameras having increasingly wider fields-of-view are arranged around camera (1). As shown in FIG. 3, a second camera (left camera (2)) is located on the immediate left of camera (1) and a third camera (right camera (2)) is located on the immediate right of camera (1). Similarly, a fourth camera (left camera (3)) is located to the immediate left of the second camera (left camera (2)) and a fifth camera (right camera (3)) is located to the immediate right of the third camera (right camera (2)). Likewise, this arrangement continues for an N number of cameras on the left side such that a left camera (N) is located at the leftmost edge of the hemispherical edge 300, and a right camera (N) is located at the rightmost edge of the hemispherical edge 300. It should be noted that N may be any number greater than or equal to two. Note, however, that with too many cameras the stitching becomes very difficult. On the other hand, with too few cameras, each individual camera would need to have a large field-of-view. In some embodiments, five cameras (N=3) in the foveated wide-angle camera system 120 achieve a good balance.

As shown in FIG. 3, each of the cameras arranged on either side of camera (1) has an increasing field-of-view, as shown by the arrows and the dashed lines on the cameras. In particular, examining the left side of the foveated wide-angle camera 120, camera (1) has the narrowest field-of-view, the left camera (2) has a wider field-of-view than camera (1), the left camera (3) has a wider field-of-view than the left camera (2), and so forth until the left camera (N) has the widest field-of-view of all of the cameras on the left side. Similarly, examining the right side of the foveated wide-angle camera 120, camera (1) has the widest field-of-view, the right camera (2) has a wider field-of-view than camera (1), the right camera (3) has a wider field-of-view than the right camera (2), and so forth until the right camera (N) has the widest field-of-view of all cameras on the right side of the foveated wide-angle camera 120. In one arrangement of the invention, a left camera and a corresponding right camera have approximately the same field-of-view. For example, the left camera (2) and right camera (2) could have approximately the same field-of-view, the left camera (3) and the right camera (3) could have approximately the same field-of-view, and so forth.

Figure 4:
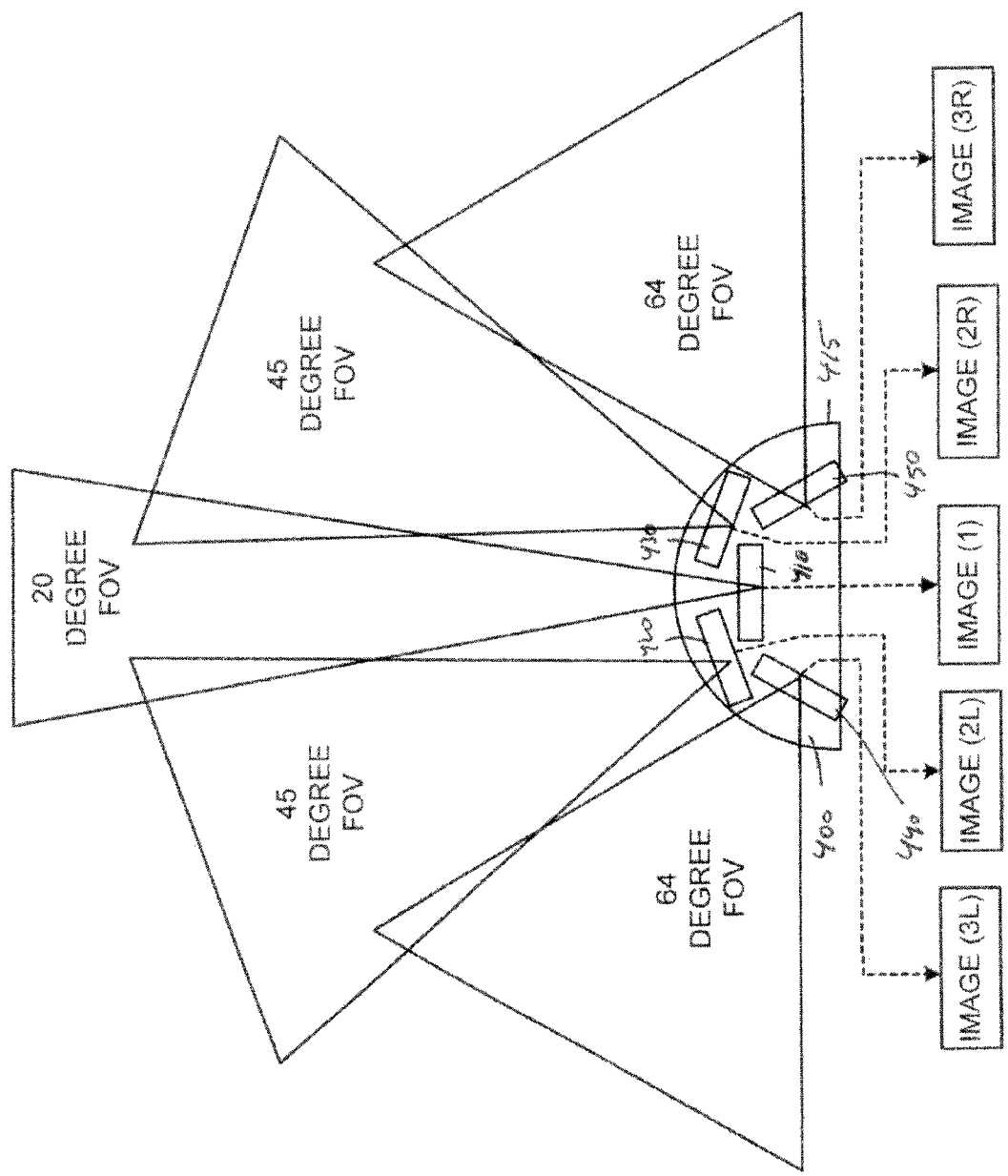
FIG. 4 is a detailed example of the foveated wide-angle camera system shown in FIGS. 1 and 3.

FIG. 4 is a detailed example of the foveated wide-angle camera system 120 shown in FIGS. 1 and 3. It should be noted that this example is only one of several ways in which the foveated wide-angle camera 120 may be implemented. Referring to FIG. 4, a foveated wide-angle camera 400 (which is an example of the foveated wide-angle camera 120) contains five cameras in a hemispherical arrangement. In particular, a center camera 410 is located at a center of a hemispherical edge 415 of the foveated wide-angle camera 400. On the left side of the center camera 410 is a second camera 420 and on the right side of the center camera 410 is a third camera 430. On a left side of the second camera 420 is a fourth camera 440 and on a right side of the third camera 430 is a fifth camera 450.

In this example the second and third camera have the same field-of view and the fourth and fifth cameras have the same field-of-view. The center camera 410 has a field-of-view (FOV) of approximately 20 degrees, the second camera 420 and the third camera 430 have a field-of-view of approximately 45 degrees, and the fourth camera 440 and the fifth camera 450 have a field-of-view of approximately 64 degrees. Each of the cameras 410, 420, 430 440, 450 has a corresponding output image. As shown in FIG. 4, the corresponding output image for the center camera 410 is image (1), for the second camera 420 is image (2L), for the third camera 430 is image (2R), for the fourth camera 440 is image (3L), and for the fifth camera 450 is image (3R). Together, the output images capture a foveated wide-angle image of a scene with image (1) from the center camera 410 having the highest pixel density (due to the narrowest field-of-view) and the outer images having an increasingly lower pixel density due to wider field-of-view cameras.

Figure 13:
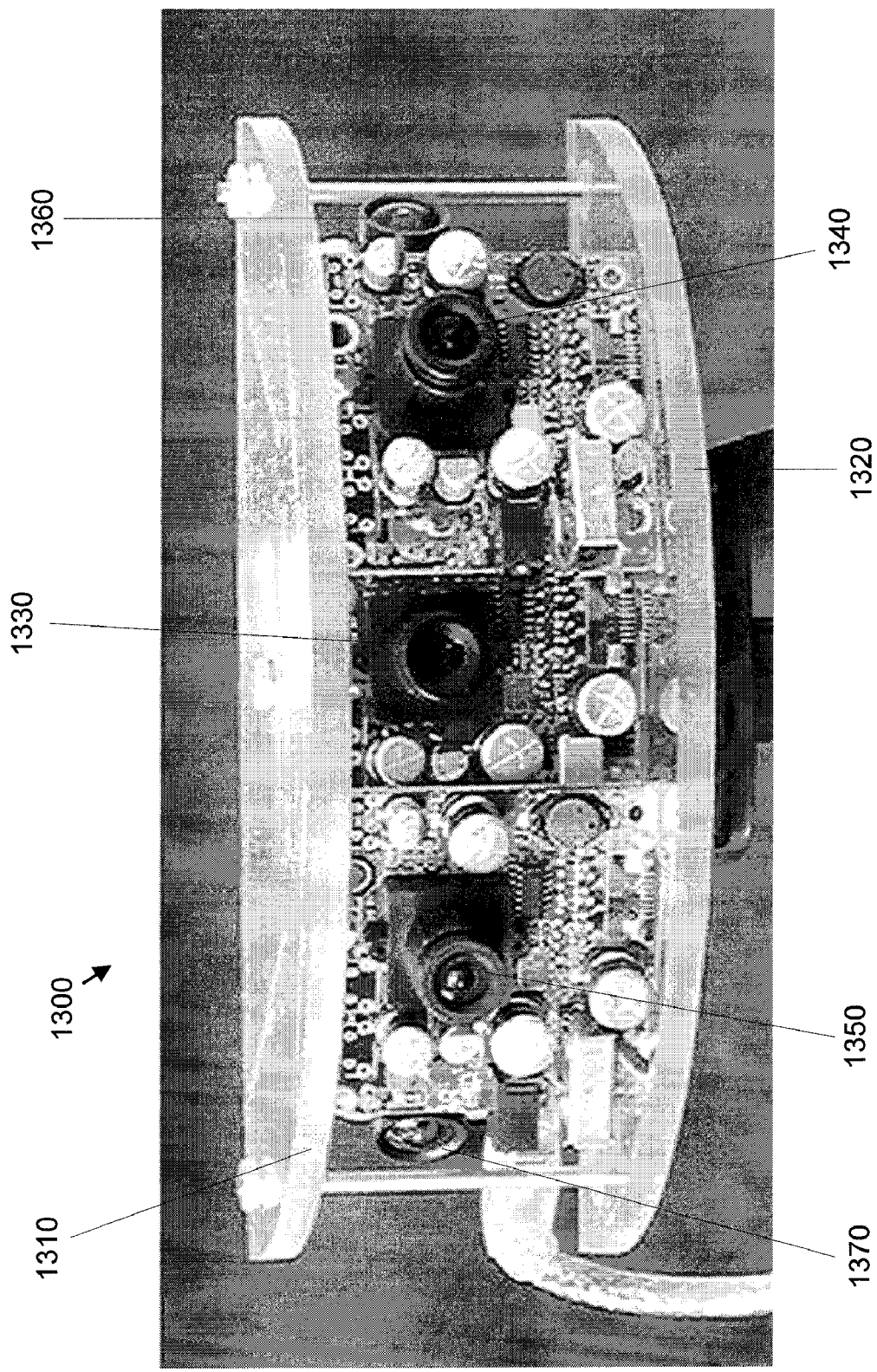
FIG. 13 illustrates a working example of the foveated wide-angle camera system shown in FIGS. 1, 3 and 4.

FIG. 13 illustrates a working example of the foveated wide-angle camera system shown in FIGS. 1, 3 and 4. In FIG. 13, a front view of a foveated wide-angle camera 1300 is shown. The foveated wide-angle camera 1300 contains five cameras in a hemispherical arrangement. The five cameras are sandwiched between a top hemispherical plate 1310 and a bottom hemispherical plate 1320. Between the plates 1310, 1320 is a first camera 1330 is located at a center of the foveated wide-angle camera 1300. On the left side of the first camera 1330 is a second camera 1340 and on the right side of the center camera 1330 is a third camera 1350. On a left side of the second camera 1340 is a fourth camera 1360 and on a right side of the third camera 1350 is a fifth camera 1370. In this working example, the first camera 1330 has a field-of-view (FOV) of approximately 20 degrees, the second camera 1340 and the third camera 1350 have a field-of-view of approximately 45 degrees, and the fourth camera 1360 and the fifth camera 1370 have a field-of-view of approximately 64 degrees.

Foveated Wide-Angle Image Stitching System

The output images from each of the plurality of cameras of the foveated wide-angle camera 120 are sent to a foveated wide-angle image stitching system 130. The foveated wide-angle image stitching system 130 generates a stitch table that maps a pixel in the output images of the foveated wide-angle camera 120 to a preliminary wide-angle image. The preliminary wide-angle image is "stitched" together from each of the output images of the individual cameras.

Figure 5:
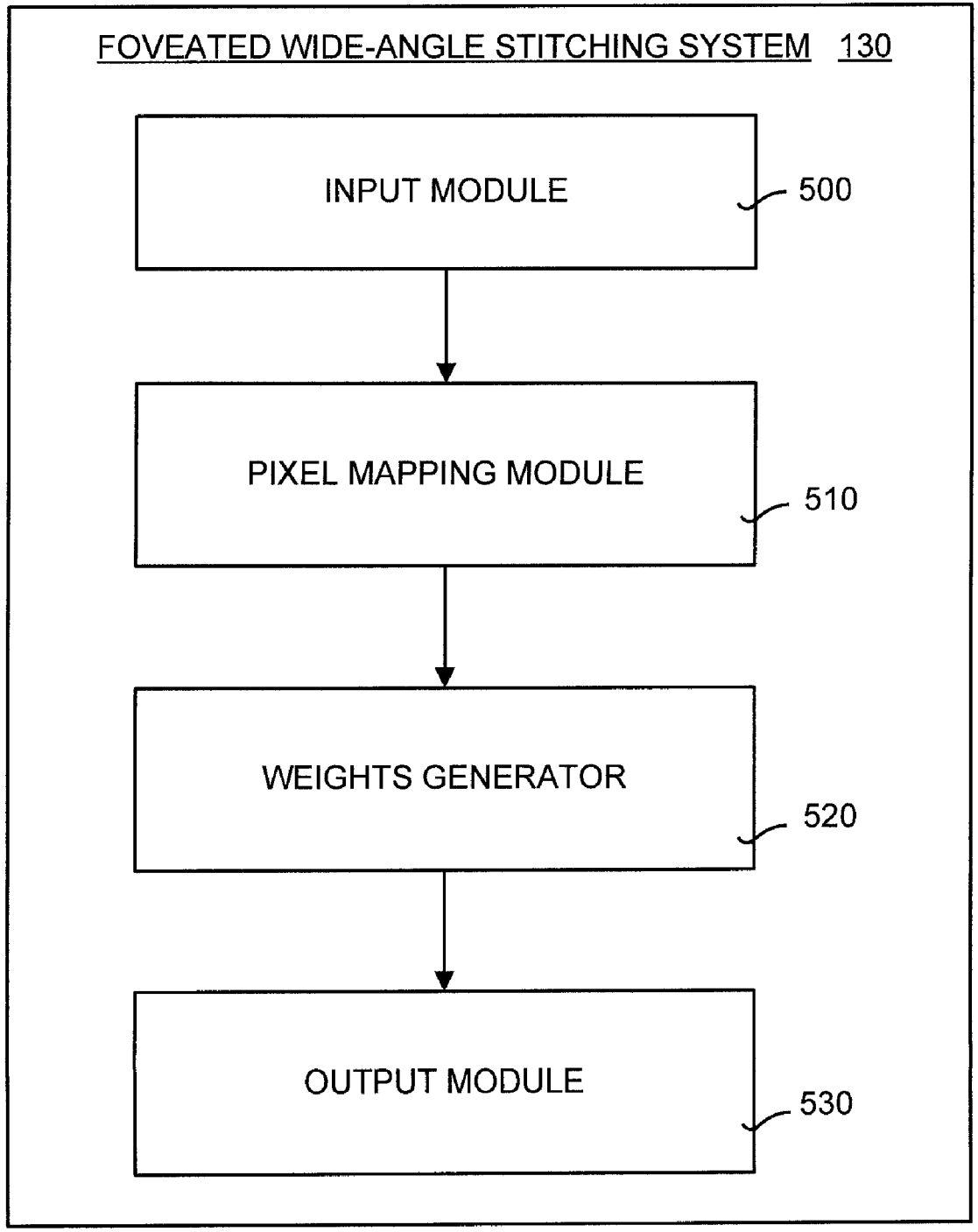
FIG. 5 is a general block diagram illustrating the foveated wide-angle image stitching system shown in FIG. 1.

FIG. 5 is a general block diagram illustrating the foveated wide-angle image stitching system 130 shown in FIG. 1. In general, the foveated wide-angle image stitching system 130 inputs a plurality of raw output images from each of the cameras in the foveated wide-angle camera 120 and outputs a stitch table. Specifically, an input module 500 of the foveated wide-angle image stitching system 130 receives each of the raw images that are captured by the foveated wide-angle camera 120. A pixel mapping module 510 is used to select a pixel and then map that pixel from the raw images to a preliminary wide-angle image. In some cases more than one pixel from the raw images will map to the preliminary wide-angle image. A weights generator 520 is used to generate weights for each pixel. These weights are used to determine which pixel should be used in the stitch table in the situation where multiple pixels from the raw images can be mapped to the preliminary wide-angle image. An output module 530 is used to construct a stitch table containing pixel coordinates and weights. This stitch table is the output of the foveated wide-angle image stitching system 130.

Real-Time Wide-Angle Image Correction System

Figure 6:
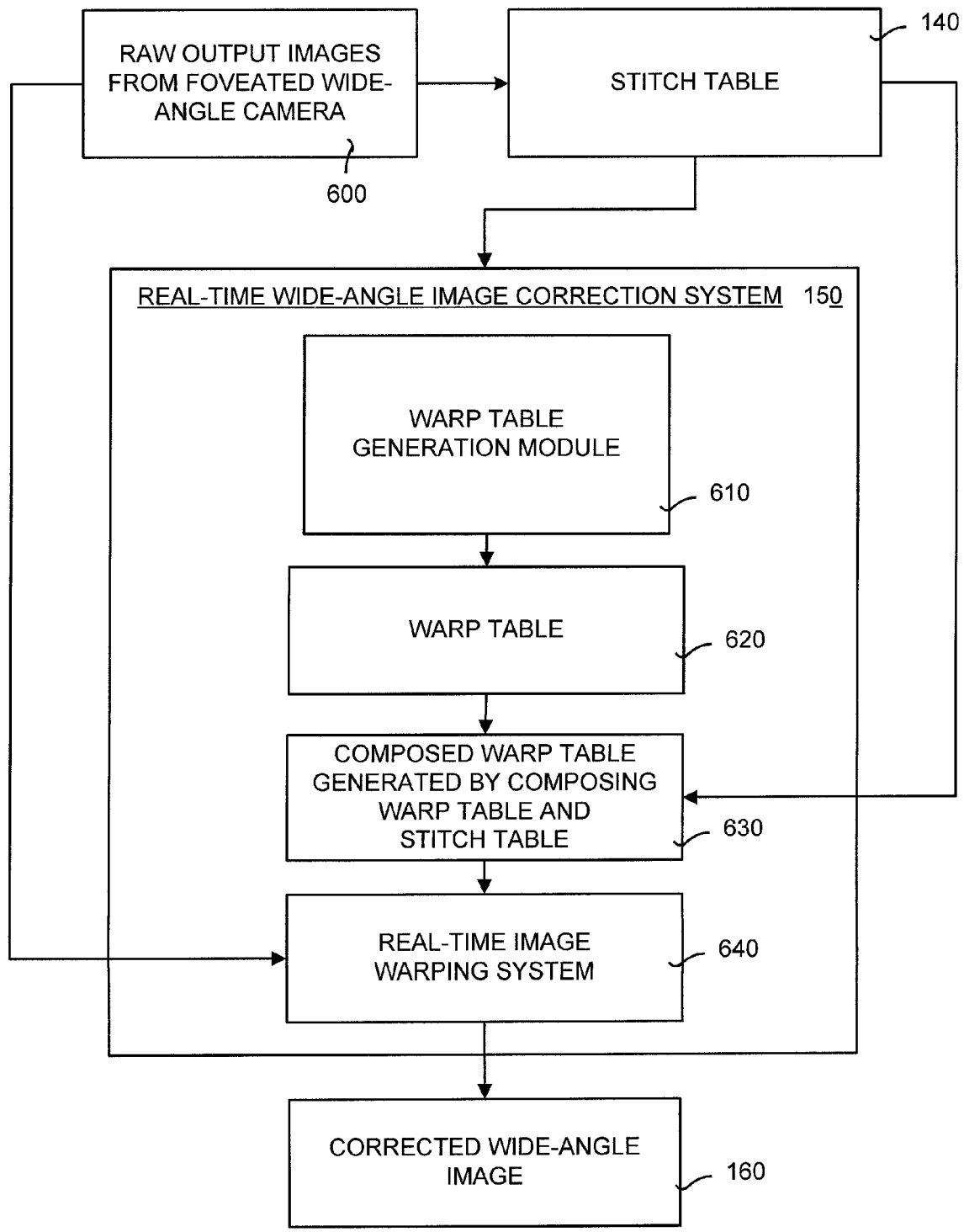
FIG. 6 is a general block diagram illustrating the real-time wide-angle image correction system shown in FIG. 1.

FIG. 6 is a general block diagram illustrating the real-time wide-angle image correction system 150 shown in FIG. 1. In general, the real-time wide-angle image correction system 150 inputs raw output images 600 from the foveated wide-angle camera 120 and the stitch table 140 that contains pixel coordinates from the raw output image 600 and weights. The output of the real-time wide-angle image correction system 150 is the corrected wide-angle image 160.

The stitch table 140 contains pixel coordinates of pixels in the raw output images 600 that can be used to generate a preliminary foveated wide-angle image. The pixel coordinates may be, for example, expressed in a rectilinear coordinate frame such that the pixel coordinates are (x,y) locations of each of the pixels within the raw output images 600. The real-time wide-angle image correction module 150 includes a warp table generation module 610, a warp table 620, a composed warp table 630, and a real-time image warping system 640.

The warp table generation module 610 is used to generate the warp table 620 using a warping function. The warp table 620 is composed with the stitch table 140 to generate the composed warp table 630. The composed warp table 630 contains the pixel coordinates from the stitch table 140 arranged in such a way to correspond to a location in the corrected wide-angle image 160. Thus, the composed warp table 630 determines the new location in the corrected wide-angle image 160 for the pixel coordinates from the stitch table 140. This effectively maps pixels in the raw output images 600 from the foveated wide-angle camera 120 to the corrected wide-angle image 160.

Once the composed warp table 630 has been generated the raw output images 600 are received as input to the real-time image warping system 640. The real-time image warping system 640 applies the composed warp table 630 to the raw output images 600 to generate the corrected wide-angle image 160 in real time. The real-time image warping system 640 creates the corrected wide-angle image 160 by obtaining RGB values for each pixel in the raw output images 600 and using the composed warp table 630 to map those RGB values to the corresponding pixel in the corrected wide-angle image 160.

The warping process occurs in real-time because the composed warp table 630 has already been generated, meaning all that is required to create the corrected wide-angle image 160 is to apply the composed warp table 630 to the raw output images 600. In summary, the real-time wide-angle image correction system 150 generates a composed warp table 630 by using a warping function to create the warp table 620 and then composing the warp table 620 with the stitch table 140. The corrected wide-angle image 160 then is generated from the raw output images 600 using the composed warp table 630.

IV. Operational Overview

The foveated wide-angle imaging method of the invention uses the foveated wide-angle camera system described above to capture a scene. The output from the foveated wide-angle camera then is processed to correct any distortion and perception errors inherent in wide-angle images. The processing occurs by composing a stitch table with a warping function to generate a composed warp table. Using the composed warp table, additional images from the foveated wide-angle camera can be processed in real time to generate a corrected wide-angle image for viewing a corrected and undistorted wide-angle image of the scene.

Figure 7:
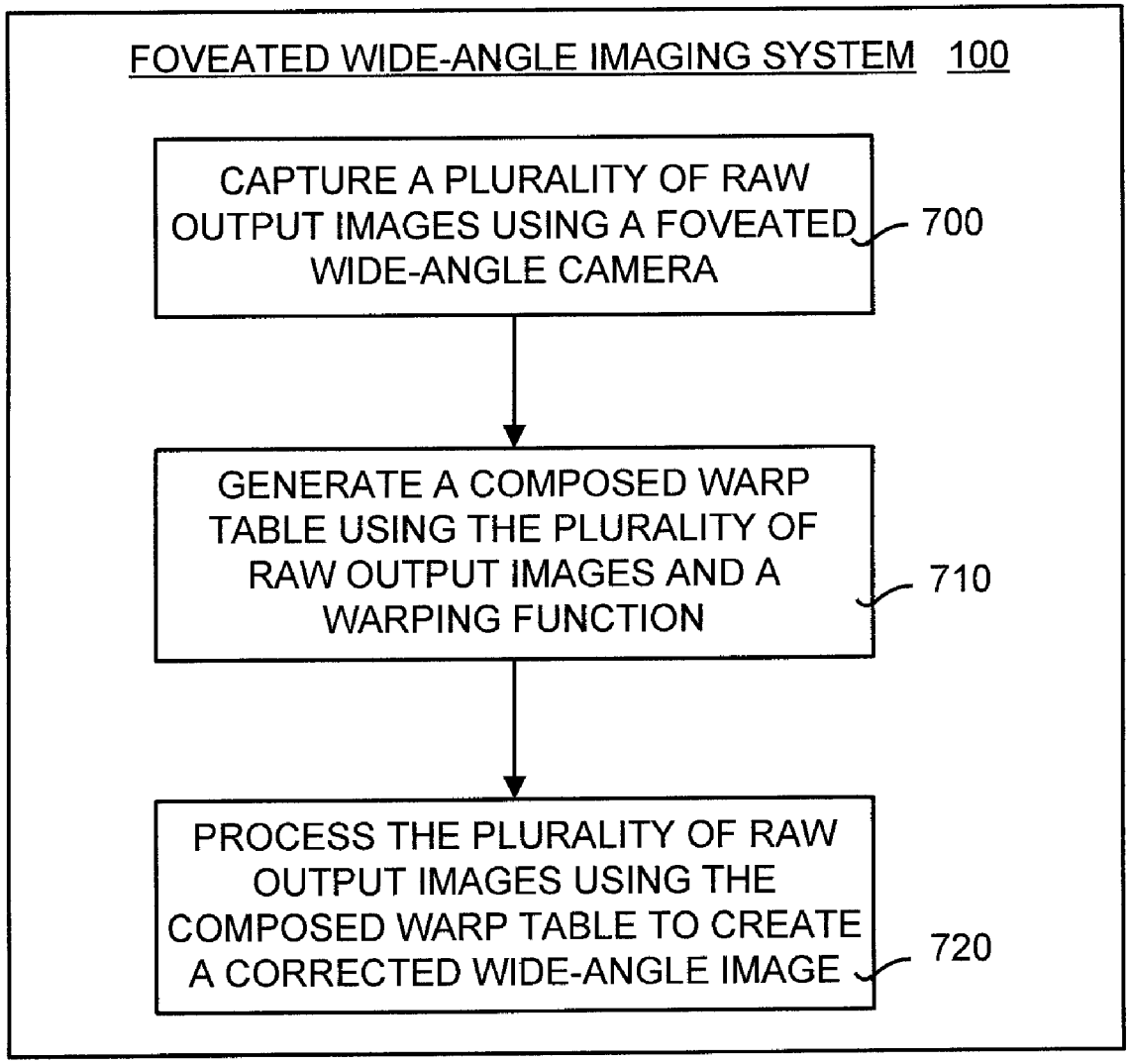
FIG. 7 is a general flow diagram illustrating the operation of the foveated wide-angle imaging method of the invention.

FIG. 7 is a general flow diagram illustrating the operation of the foveated wide-angle imaging method of the invention. The method begins by capturing a plurality of raw output images using a foveated wide-angle camera (box 700). These plurality of raw output images are obtained from each one of the plurality of cameras of the foveated wide-angle camera. In general, as discussed above, the raw output image from the center camera has the greatest pixel density because the center camera has the narrowest field-of-view as compared to the other cameras in the foveated wide-angle camera.

A composed warp table then is generated using the plurality of raw output images and a warping function (box 710). More specifically, the plurality of raw output images is used to create a stitch table. The stitch table contains pixel coordinates of pixels in the plurality of raw output images along with weights associated with each of the pixel coordinates. The stitch table maps pixels in the plurality of raw output images to a preliminary foveated wide-angle image. By way of example, the preliminary foveated wide-angel image may be a cylindrical projection or a perspective projection. Typically, this preliminary foveated wide-angle image is not actually constructed. One reason for this is that resolution may be lost if the preliminary foveated wide-angle image is explicitly constructed. Another reason is that not explicitly constructing the preliminary foveated wide-angle image reduces the computation at run-time. This is because the preliminary foveated wide-angle image has image distortions and perception problems needing correction. It is faster and easier to correct these problems within the stitch table itself rather than actually create the preliminary foveated wide-angle image from the stitch table.

The warping function is used to generate a warp table. By way of example, the warping function can be a parametric class of image warping. The warp table and the stitch table then are composed with each other to generate the composed warp table. Once the composed warp table is generated, the plurality of raw output images from the foveated wide-angle camera are processed using the composed warp table (box 720). This processing creates a corrected wide-angle image that is virtually free from any distortion or perception problems associated with wide-angle images.

V. Operational Details and Working Examples

Figure 8:
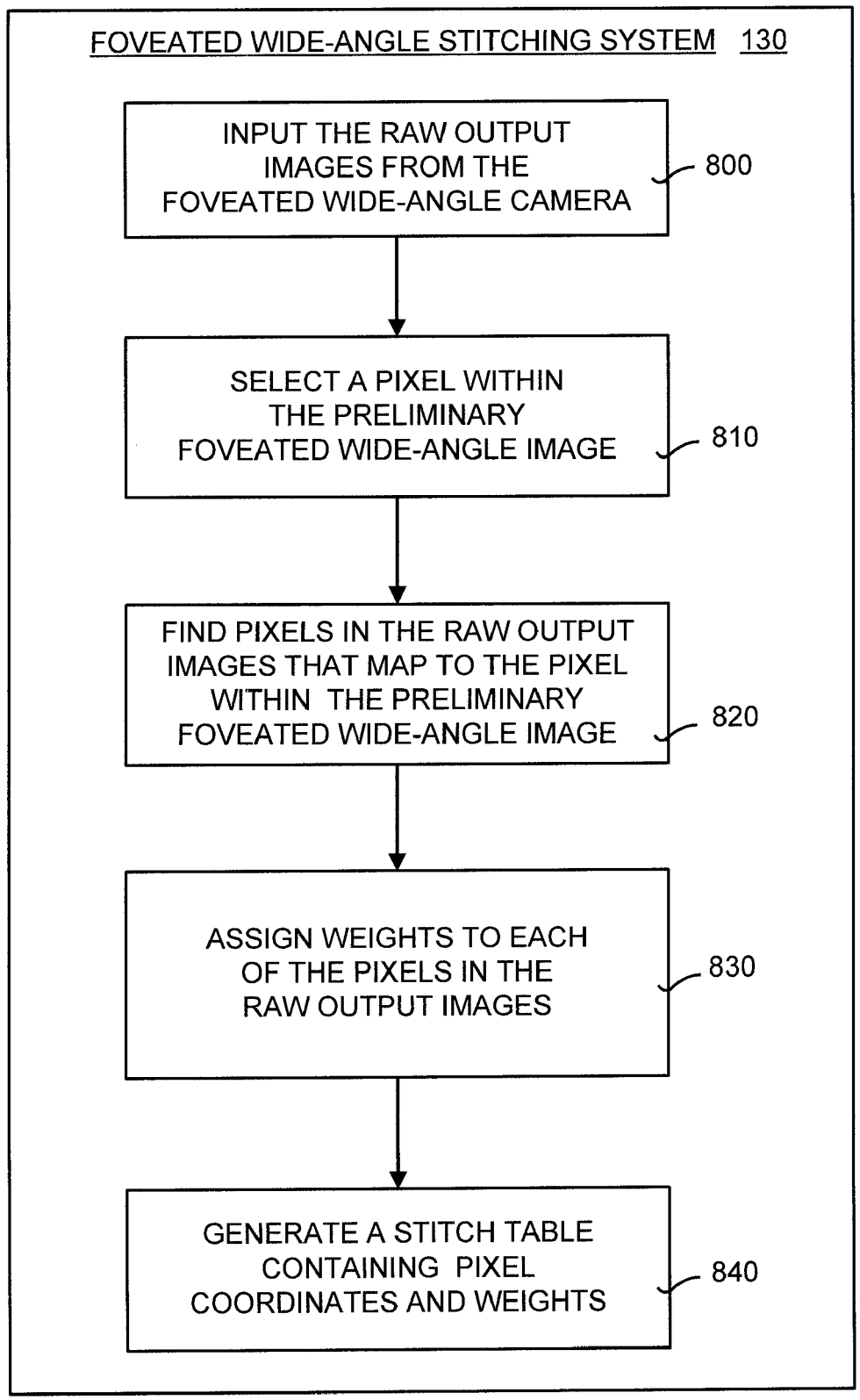
FIG. 8 is a flow diagram illustrating the details of the foveated wide-angle stitching system shown in FIG. 1.

FIG. 8 is a flow diagram illustrating the details of the foveated wide-angle stitching system shown in FIG. 1. In general, the foveated wide-angle stitching system 130 inputs raw output images from the foveated wide-angle camera 120 and outputs a stitch table 140. Specifically, the foveated wide-angle camera system 130 inputs the raw output images from the foveated wide-angle camera (box 800). Next, a pixel from a preliminary foveated wide-angle image is selected (box 810). Pixels in the raw output images that map to the pixel in the foveated wide-angel image then are found (box 820).

Once the mapping is determined, weights are assigned to each of the pixels in the raw output images (box 830). These weights are used, for example, when there is more than one pixel in the raw output images that map to a single pixel in the preliminary foveated wide-angle image. Since there can only be a one-to-one mapping, the pixel in the raw output images having the highest weight is selected. By way of example, one way in which to determine the weight of a pixel is based on the pixel's position in the raw output image. Thus, if a first pixel is near the edge of a first raw output image and another second pixel is near the center of a second raw output image, the second pixel will be assigned a higher weight. The higher weight is assigned because the second pixel is in a foveated region having a higher pixel density as compared to the first pixel. As discussed above, this foveated region was captured using the foveated wide-angle camera 120.

Finally, a stitch table containing pixel coordinates and their corresponding weights is generated (box 840). The pixel coordinates correspond to the location of pixels within the raw output images. For each pixel in the preliminary foveated wide-angle image, the stitch table stores the pixel coordinates and weights of the corresponding raw images. The location within the stitch table of a pixel coordinate represents the location of the pixel from the raw output images in the preliminary foveated wide-angle image. It should be noted that although the stitch table contains information needed to construct the preliminary foveated wide-angle image, typically the preliminary foveated wide-angle image is not constructed. As explained below, this is in part because the preliminary foveated wide-angle image contains distortion and perception problems and better performance is achieved by processing the stitch table itself. By not actually generating the stitched image, resolution loss may be avoided and it is computationally efficient.

Figure 9:
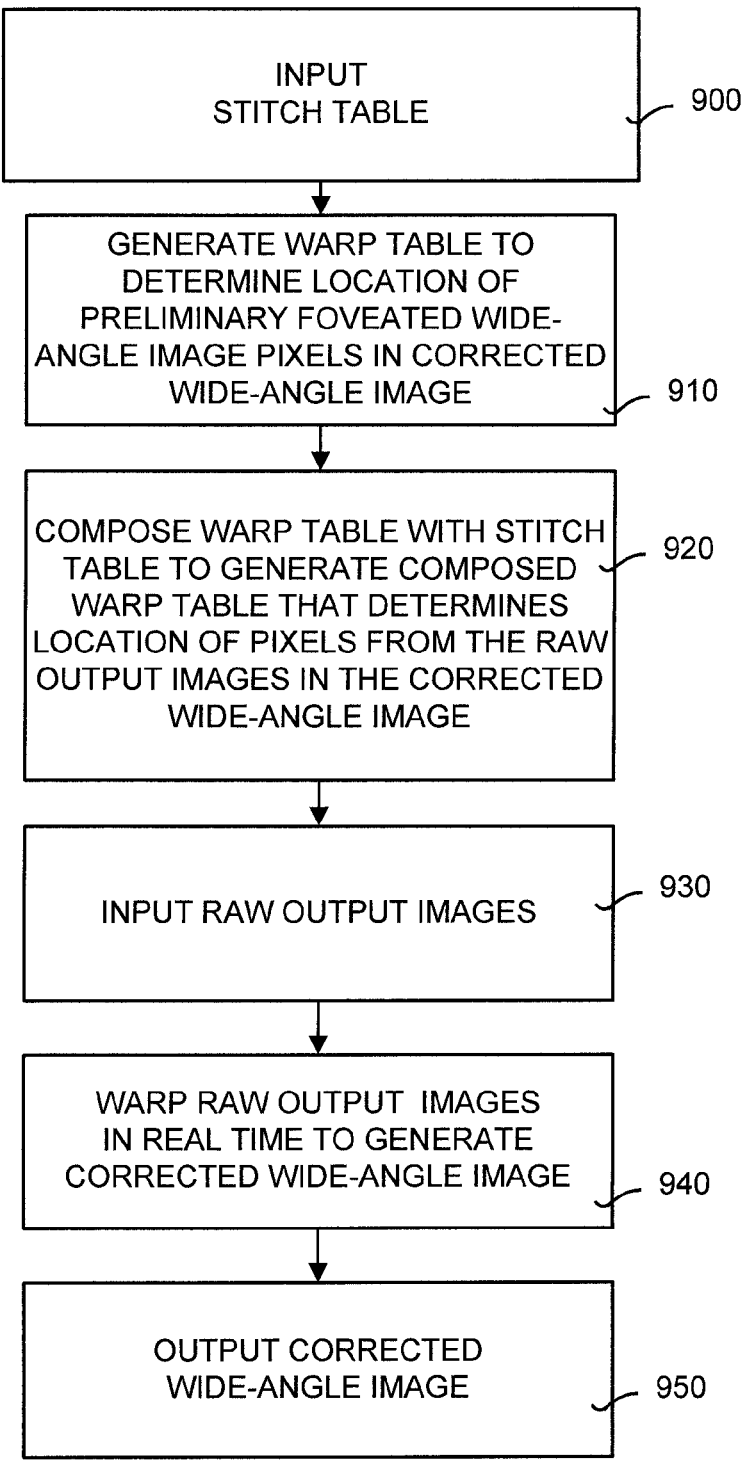
FIG. 9 is a flow diagram illustrating the details of the real-time wide-angle image correction system shown in FIG. 1.

Processing of the stitch table to correct any distortion and perception problems present in the preliminary foveated wide-angle image is performed by the real-time wide-angle image correction system 150. FIG. 9 is a flow diagram illustrating the details of the real-time wide-angle image correction system 150 shown in FIG. 1. Generally, the real-time wide-angle image correction system 150 inputs the stitch table, processes the stitch table, and outputs a corrected wide-angle image free from distortion and perception problems.

More specifically, the real-time wide-angle image correction system 150 begins by inputting a stitch table (box 900). Using the stitch table, a warp table is generated (box 910). The warp table is used to determine a location of pixels from the preliminary foveated wide-angle image in the corrected wide-angle image. The warp table then is composed with the stitch table to generate a composed warp table (box 920). The composed warp table determines a location of pixels from the raw output images in the corrected wide-angle images. In other words, the composed warp table maps a pixel from one of the raw output images to a pixel in the corrected wide-angle image.

Once the composed warp table is generated, the real-time wide-angle image correction system 150 inputs the raw output images (box 930). Using the composed warp table these raw output images are warped in real time to generate the corrected wide-angle image (box 940). The corrected wide-angle image is sent as output from the real-time wide-angle image correction system 150 (box 950). The corrected wide-angle image is a preliminary foveated wide-angle image corrected for any distortion and perception problems.

Figure 10:
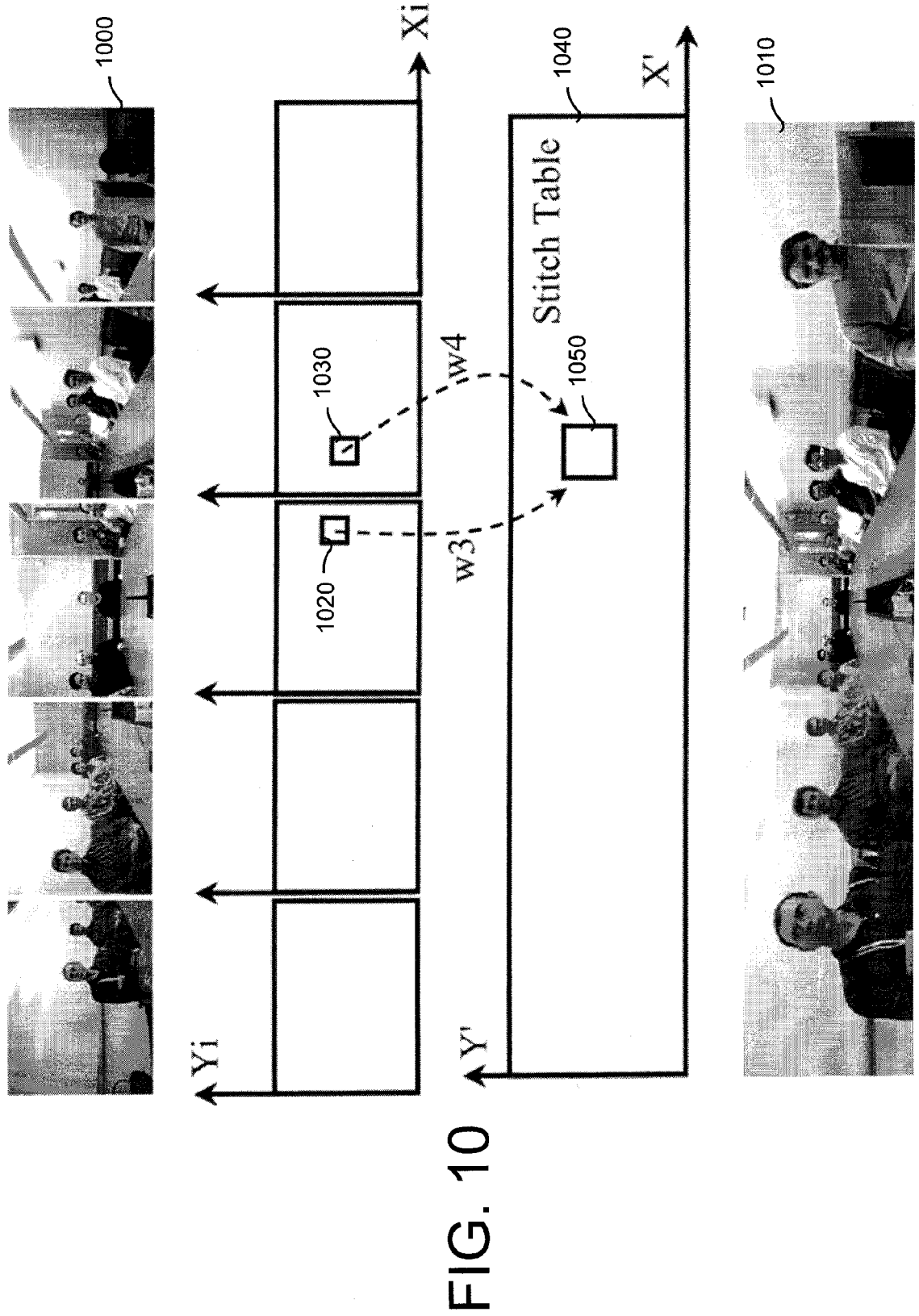
FIG. 10 is a first working example illustrating the operation and results of the foveated wide-angle imaging method when the stitch table is used to generate the preliminary foveated wide-angle image.

In order to more fully understand the foveated wide-angle imaging method of the invention, three working examples are presented. In a first working example, FIG. 10 illustrates the operation and results of the real-time wide-angle imaging method when the stitch table is used to generate the preliminary foveated wide-angle image. In particular, a set of raw output images 1000 is captured by the foveated wide-angle camera system 120. In this working example, the raw output images 1000 contain a scene of a video conference. A first rectilinear coordinate system having a vertical axis $Y_i$ and a horizontal axis $X_i$ is constructed and applied to the set of raw output images 1000.

Next, a pixel in the preliminary foveated wide-angle image 1010 is selected. Pixels from the raw output images 1000 that map to the pixel then are found. In this working example, a first pixel 1020 from a third (or center) image of the raw output images 1000 and a second pixel 1030 from a fourth image of the raw output images 1000 maps to the selected pixel. As shown by the dashed lines, the first pixel 1020 and the second pixel 1030 are entered in a stitch table 1040 at a certain location 1050. A second rectilinear coordinate system having a vertical axis Y' and a horizontal axis X' is constructed and applied to the stitch table 1040.

In addition, weights are assigned to the first pixel 1020 (w3) and the second pixel 1030 (w4). These weights indicate how these pixels should be blended together when they are both mapped to the same location in the preliminary foveated wide-angle image 1010. Each weight ranges from between 0 and 1. For any pixel location in the preliminary foveated wide-angle image, the sum of the weights of the corresponding raw output image pixels must be equal to 1. By way of example, if the first pixel 1020 and the second pixel both map to the same pixel in the preliminary foveated wide-angle image 1010, then the weights of each pixel are examined. If, for example, w3=0.32 and w4=0.7 and denoting c3 to be the color of the first pixel, and c4 the color of the second pixel, then the color of the pixel in the preliminary foveated wide-angle image 1010 is w3*c3+w4*c4. The weights are determined in such a way that the camera with a higher resolution gets a higher weight. A smooth transition (fade-in and fade-out) area between each two overlapping cameras is assigned to smoothly blend between the two cameras.

As can be seen in FIG. 10, the preliminary foveated wide-angle image 1010 is a stitching together of each of the raw output images 1000. By stitching each of the five raw output images 1000 together, the preliminary foveated wide-angle image 1010 is generated. However, as can be seen in FIG. 10, the preliminary foveated wide-angle image 1010 still contains distortion and perception errors that make the preliminary foveated wide-angle image 1010 difficult to view. For example, the people in the center of the preliminary foveated wide-angle image 1010 are quite small and difficult to see, as compared to those people in the outside of the preliminary foveated wide-angle image 1010.

Figure 11:
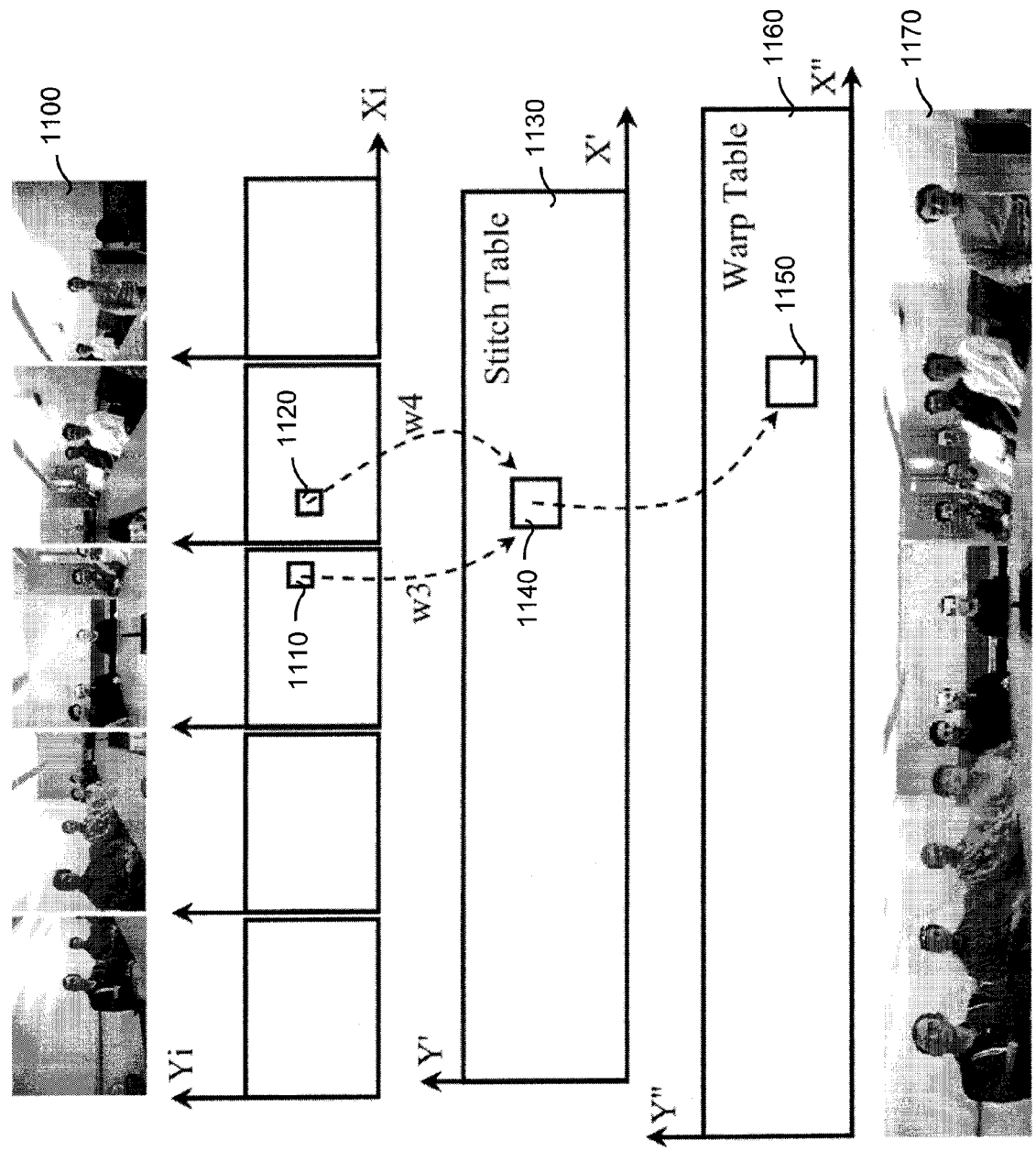
FIG. 11 is a second working example illustrating the operation and results of the foveated wide-angle imaging method when a corrected wide-angle image is generated by taking a stitch table and then using a warp table.

In a second working example, FIG. 11 illustrates the operation and results of the foveated wide-angle imaging method when a corrected wide-angle image is generated by taking a stitch table and then using a warp table. Specifically, a set of raw output image 1100 is captured by the foveated wide-angle camera system 120. A first coordinate system is established, such as a rectilinear coordinate system shown in FIG. 11 having a vertical axis $Y_i$ and a horizontal axis $X_i$. The pixel within each of the raw output images 1100 can be represented in the first coordinate system. In particular, a first pixel 1110 having a weight w3 and a second pixel 1120 having a weight w4 are obtained from the raw output images 1100.

As shown by the dashed lines, the first pixel 1110 and the second pixel 1120 are placed at a location in a stitch table 1130. A second coordinate system is established, such as a rectilinear coordinate system shown in FIG. 11 having a vertical axis Y' and a horizontal axis X'. The first pixel 1110 and the second pixel 1120 are located at a position 1140 in the stitch table 1130. The two pixels are blended together based on their weights. According to the warp table 1160, the resulting color is assigned to the pixel coordinate 1150 in the final corrected wide-angle image 1170 to transform the position 1140 to pixel coordinates 1150 in the warp table 1160. A third coordinate system is established for the warp table 1160, such as a rectilinear coordinate system shown in FIG. 11 having a vertical axis Y" and a horizontal axis X". The pixel coordinate 1150 in the warp table 1160 along with the other pixel coordinates in the warp table 1160 are used to construct a corrected wide-angle image 1170.

As seen in FIG. 11, the corrected wide-angle image 1170 obtained by using stitch table and then the warp table is an improvement over the preliminary foveated wide-angle image 1010 shown in FIG. 10. However, a careful observation of the corrected wide-angle image 1170 in FIG. 11 reveals that there are still some artifacts in the image 1170. This is especially evident by looking at the person's face located in the center of the image 1170.

Figure 12:
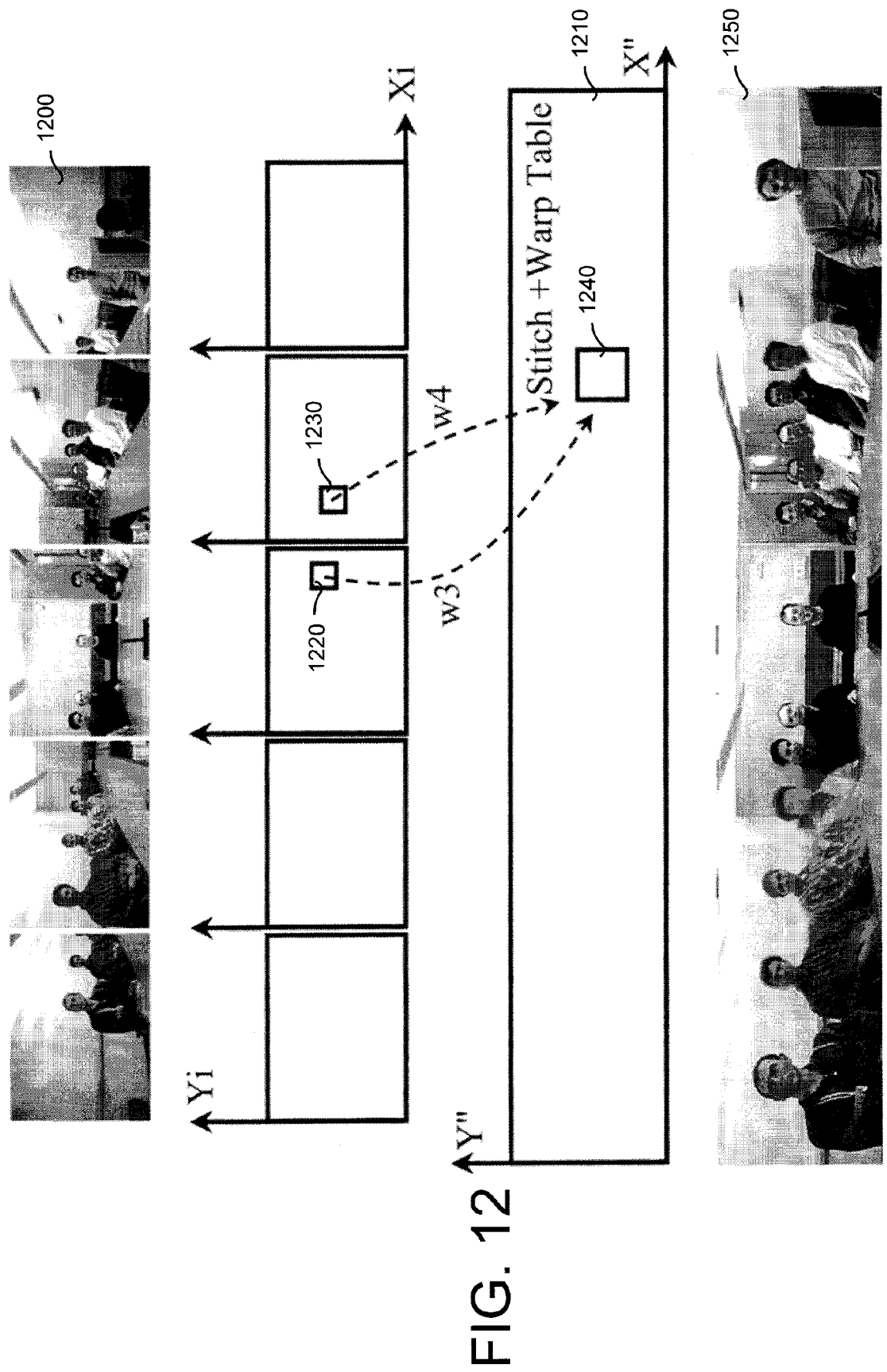
FIG. 12 is a third working example illustrating the operation and results of the foveated wide-angle imaging method when a corrected wide-angle image is generated by composing a stitch table with the warp table.

A third working example illustrates an exemplary foveated wide-angle imaging method shown in FIG. 7. FIG. 12 illustrates the operation and results of the foveated wide-angle imaging method when a corrected wide-angle image is generated by composing a stitch table with a warp table. As before, a set of raw output images 1200 are captured using the foveated wide-angle camera system 120. In this working example, the number of raw output images 1200 obtained is five. A first coordinate system then is applied to the raw output images 1200. In this working example, the first coordinate system is a rectilinear coordinate system having a vertical axis $Y_i$ and a horizontal axis $X_i$.

A stitch table and a warp table are composed to generate a composed warp table 1210. A second coordinate system is applied to the composed warp table 1210. In this working example, the second coordinate system is a rectilinear coordinate system having a vertical axis Y" and a horizontal axis X". The composed warp table 1210 is applied to the raw output images 1200. As shown in FIG. 12, the composed warp table 1210 is applied to a first pixel 1220 having a weight w3 and to a second pixel 1230 having a weight w4. One of these pixels is selected, based on its weight, and placed at a pixel coordinate 1240 in the composed warp table 1210. This process continues until all of the pixel coordinates in the composed warp table 1210 have been filled.

A corrected wide-angle image 1250 is constructed using the pixel coordinates in the composed warp table 1210. In particular, the corrected wide-angle image 1250 by selecting a pixel in the image 1250 and going back to the pixel from the raw output images 1200 that maps to that pixel. The RGB value for the pixel in the raw output images 1200 is applied to the corresponding pixel in the corrected wide-angle image 1250. This is continued until the corrected wide-angle image has been constructed.

As can be seen from FIG. 12, this working example of using the composed warp table provides the best final image. In particular, the corrected wide-angle image 1250 has less distortion and perception errors as compared to the corrected wide-angle image 1170 of FIG. 11 and the preliminary foveated wide-angle image 1010 of FIG. 10.

In this third working example, the warping of the raw output images 1200 was achieved by using a parametric class of image warping functions. These functions attempt to minimize the image perception problems caused by a viewer having smaller field-of-view than an imaging apparatus. The parametric class of image warping functions is called Spatially Varying Uniform Scaling functions, or SVU scaling functions. In this third working example, parametric image warping functions (such as SVU scaling functions) were determined using a set of curves and scaling factors. Using these source curves and the warping factor, target curves were computed. These processes are discussed in detail in a co-pending patent application U.S. Ser. No. 10/186,915, entitled "Real-Time Wide-Angle Image Correction System and Method for Computer Image Viewing" by Zicheng Liu and Michael Cohen, filed Jun. 28, 2002. In general, however, although SVU scaling functions may locally resemble a uniform scaling function to preserve aspect ratios, the scaling factor varies over the image to create warp. In addition, the class of conformal projections can provide local uniform scaling, but these functions introduce rotations, which are visually disturbing. SVU scaling functions avoid rotations and remove swimming motions when viewing panoramic images.

It should be noted that this third working example is only one way in which warping functions may be used to dewarp the raw output images 1200, and is provided for illustrative purposes only. Several other types of warping functions may be used to dewarp the raw output images 1200.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A foveated wide-angle imaging system for capturing and viewing a wide-angle image, comprising:
   a foveated wide-angle camera system having a plurality of cameras that outputs raw output images;
   a center camera of the plurality of cameras that has a narrower field-of-view compared to a remainder of the plurality of cameras;
   a left set of cameras of the plurality of cameras located on a left of the center camera, each camera in the left set of cameras having an increasingly wider field-of-view when moving away to the left from the center camera, such that a first left camera next to and to the left of the center camera has a field-of-view wider than the center camera and a second left camera that is next to and to the left of the first left camera has a field-of-view wider than the center camera and the first left camera;
   a right set of cameras of the plurality of cameras located on a right of the center camera, each camera in the right set of cameras having an increasingly wider field-of-view when moving away to the right from the center camera, such that a first right camera next to and to the right of the center camera has a field-of-view wider than the center camera and a second right camera that is next to and to the right of the first right camera has a field-of-view wider than the center camera and the first right camera; and
   a foveated wide-angle image stitching system that processes the raw output images to generate a preliminary foveated wide-angle image.

2. The foveated wide-angle imaging system of claim 1, further comprising:
   a stitch table having pixel coordinates for the preliminary foveated wide-angle image, wherein the preliminary foveated wide-angle image is produced by stitching together the raw output images;
   a real-time wide-angle image correction system that processes the stitch table to correct any distortion and perception problems and errors in the preliminary foveated wide-angle image; and
   a corrected wide-angle image generated from the preliminary foveated wide-angle image after processing by the real-time wide-angle image correct system.

3. The foveated wide-angle imaging system of claim 2, wherein the real-time wide-angle image correction system further comprises a warp table generation module that generates a warp table.

4. The foveated wide-angle imaging system of claim 3, wherein the real-time wide-angle image correction system further comprises a composed warp table generated by composing the stitch table with the warp table.

5. The foveated wide-angle imaging system of claim 4, further comprising a real-time image warning system that applies the composed warp table to the raw output images to generate the corrected wide-angle image.

6. The foveated wide-angle imaging system of claim 1, wherein the plurality of cameras of the foveated wide-angle camera system are arranged in approximately a hemispherical shape.

7. The foveated wide-angle imaging system of claim 1, wherein the foveated wide-angle stitching system further comprises a pixel mapping module that selects a pixel and maps the pixel from the raw output images to the preliminary foveated wide-angle image.

8. The foveated wide-angle imaging system of claim 7, wherein the foveated wide-angle stitching system further comprises a weights generator that generates a weight for the pixel.

9. A foveated wide-angle camera system for generating a preliminary foveated wide-angle image, comprising:
   a plurality of cameras arranged in a hemispherical shape, the plurality of cameras comprising:
      a center camera disposed near a center of the system for capturing a center raw output image;
      a second camera disposed on a left side of the center camera along the hemispherical shape for capturing a left raw output image, the second camera having a wider field-of-view than the center camera;
      a third camera disposed on a right side of the center camera along the hemispherical shape for capturing a right raw output image, the third camera having a wider field-of-view than the center camera;
      a fourth camera disposed on a left side of the second camera along the hemispherical shape having a wider field-of-view than the second camera and the center camera; and
      a fifth camera disposed on a right side of the third camera along the hemispherical shape having a wider field-of-view than the third camera and the center camera.

10. The foveated wide-angle camera system as set forth in claim 9, wherein the preliminary foveated wide-angle image includes the center raw output image, the left raw output image, and the right raw output image.

11. The foveated wide-angle camera system as set forth in claim 9, wherein the center raw output image has a higher pixel density than other raw output images.

12. The foveated wide-angle camera system as set forth in claim 9 further comprising:
   a real-time wide-angle image correction system for viewing wide-angle images, comprising:
      a stitch table generated from the center raw output image, the left raw output image, and the right raw output image;
      a warp generation module for generating a warp table;
      a composed warp table created by composing the stitch table with the warp table; and
      a real-time image warping system that processes the center raw output image, the left raw output image, and the right raw output image to correct distortion and perception problems to produce a corrected wide-angle image.

13. The foveated wide-angle camera system as set forth in claim 12, wherein the stitch table contains pixel coordinates of pixels in the center raw output image, the left raw output image, and the right raw output image, along with a weight for each pixel.

14. The foveated wide-angle camera system as set forth in claim 12, wherein the warp table generation module uses a warping function that is a Spatially Varying Uniform Scaling function belonging to a parametric class of image warping functions.

15. A method for capturing and viewing wide-angle images, comprising:

a capture step for using a foveated wide-angle camera system having a plurality of cameras to capture a plurality of raw output images, the plurality of cameras arranged in a hemispherical shape around a center camera with a left set of cameras located on a left of the center camera and a right set of cameras located on a right of the center camera, with the center camera having a narrow field-of-view and each camera in the left set of cameras having an increasingly wider field-of-view when moving away to the left from the center camera, such that a first left camera next to and to the left of the center camera has a field-of-view wider than the center camera and a second left camera that is next to and to the left of the first left camera has a field-of-view wider than the center camera and the first left camera, and each camera in the right set of cameras having an increasingly wider field-of-view when moving away to the right from the center camera, such that a first right camera next to and to the right of the center camera has a field-of-view wider than the center camera and a second right camera that is next to and to the right of the first right camera has a field-of-view wider than the center camera and the first right camera;

a composed warp table generation step for generating a composed warp table using the plurality of raw output images and a warping function; and a processing step for processing the plurality of raw output images using the composed warp table to generate a corrected wide-angle image.

16. The method of claim 15, the composed warp table generation step further comprises:

a stitch table generation step for generating a stitch table from the plurality of raw output images that maps pixels in the plurality of raw output images to a preliminary foveated wide-angle image; and a generation step for generating the composed warp table using the stitch table.

17. The method of claim 16, further comprising:

a warp table generation step for generating a warp table; and a composition step for composing the warp table and the stitch table to generate the composed warp table.

18. The method of claim 16, wherein the stitch table contains pixel coordinates and weights.

* * * * *